United States Patent [19]

Brower et al.

[11] 4,442,569
[45] Apr. 17, 1984

[54] METHOD AND APPARATUS FOR REMOVING GILLS, VISCERA AND KIDNEY FROM HEAD ON FISH

[75] Inventors: Bernard C. Brower; Trevor T. Wastell, both of Gladstone, Mich.

[73] Assignee: A. W. Manufacturing Inc., Gladstone, Mich.

[21] Appl. No.: 282,024

[22] Filed: Jul. 10, 1981

[51] Int. Cl.³ .............................................. A22C 25/14
[52] U.S. Cl. ........................................ 17/52; 17/56; 17/61; 17/58
[58] Field of Search ................... 17/56, 57, 58, 59, 52, 17/61

[56] References Cited

U.S. PATENT DOCUMENTS

| | | | |
|---|---|---|---|
| 1,223,468 | 4/1917 | Brierly et al. | 17/58 |
| 1,384,877 | 7/1921 | Waugh | 17/58 |
| 1,471,567 | 10/1923 | Nicholson | 17/58 |
| 2,177,013 | 10/1939 | Zandt et al. | 17/58 |
| 2,704,378 | 3/1955 | Schlichting | 17/54 |
| 3,570,048 | 3/1971 | Michael | 17/56 |
| 4,091,506 | 5/1978 | Soerensen | 17/56 X |

FOREIGN PATENT DOCUMENTS 1121626  7/1968  United Kingdom ................... 17/58

Primary Examiner—Willie G. Abercrombie
Attorney, Agent, or Firm—Andrus, Sceales, Starke & Sawall

[57] ABSTRACT

A fish processing machine for removing the gills, viscera and blood line kidney from head on fish. The machine includes an adjustable positioning ramp located upstream from a pair of spaced apart belly cutting blades. The adjustment of the height of the positioning ramp combined with the spacing between the belly blades is such that the tongue can be cut away from the jaw but left attached to the gills. The fish is then transported downstream with its tongue riding lower than its head and ribs. A gill removal wheel utilizes the tongue to pull the gills from their gill cavities thus removing the gills and viscera. Another cleaning wheel located downstream of the gill removal wheel removes the blood line kidney. A method for removing the gills, viscera and kidney from head on fish is also disclosed.

18 Claims, 9 Drawing Figures

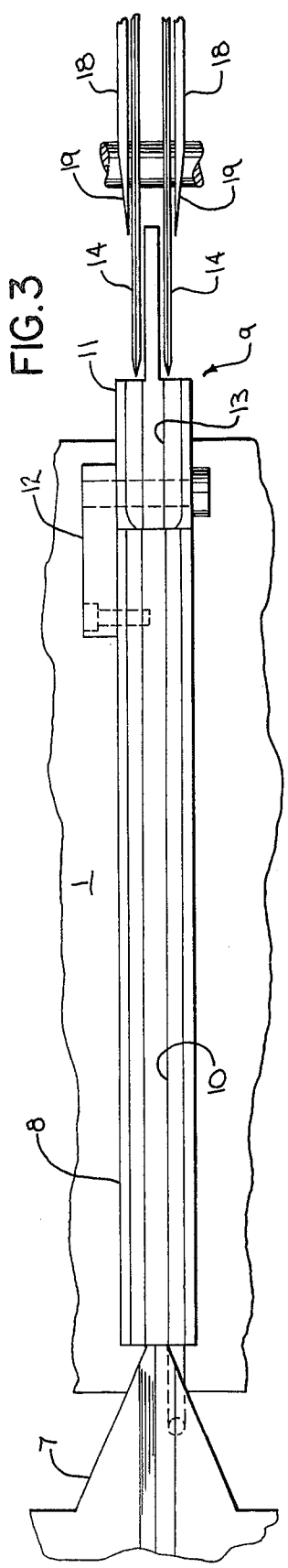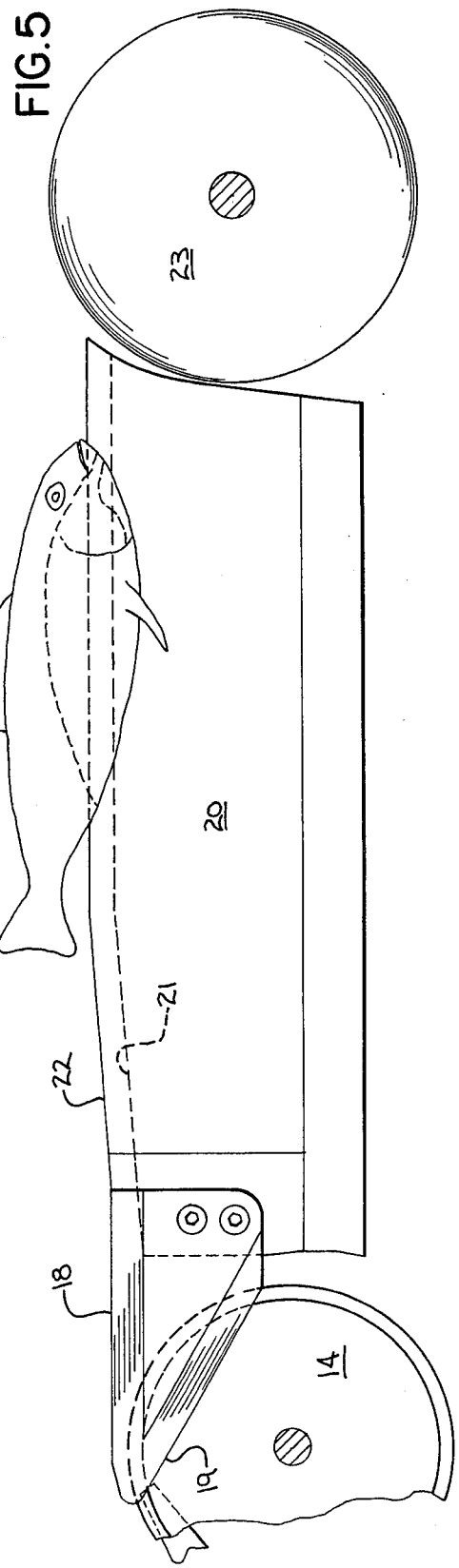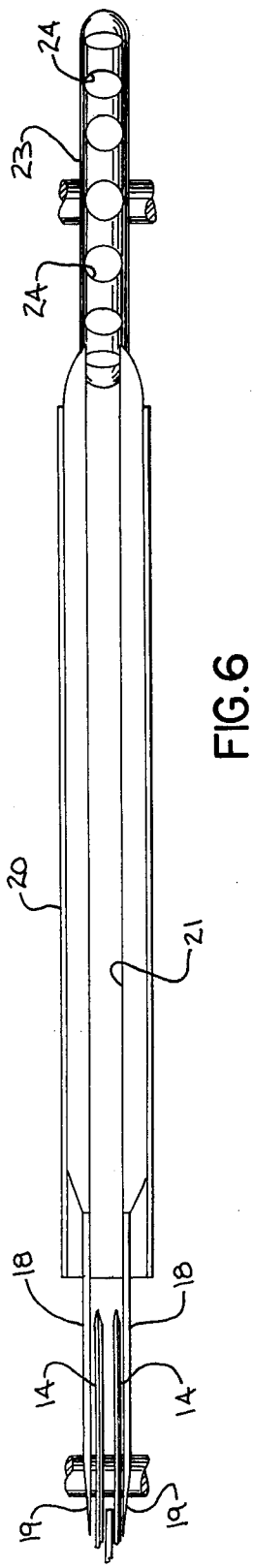

METHOD AND APPARATUS FOR REMOVING GILLS, VISCERA AND KIDNEY FROM HEAD ON FISH

BACKGROUND OF THE INVENTION

The present invention relates to fish processing, and more particularly to a method and apparatus for removing the gills, viscera and blood line kidney from head on fish.

When cleaning head on fish such as trout it is necessary to remove the gills, viscera and blood line kidney without damaging the head, backbone or ribs. Although fish processing machines have been designed for cleaning head on fish none have been totally satisfactory. In particular, the prior art machines are size limited, that is, these machines can only work on a narrow size range of fish at any one time. Problems with correctly positioning different size fish have resulted in undesirable damage to the fish head, backbone and ribs. Such machines also incorporate complex electro-hydraulic controls for controlling the position of cleaning and cutting devices with respect to the fish being processed, and thus are expensive to manufacture, difficult to start up, and expensive to maintain.

SUMMARY OF THE INVENTION

The present invention provides an improved method and apparatus for cleaning head on fish. The present invention removes the gills, viscera and blood line kidney without damaging the head, backbone or ribs.

The fish processing apparatus includes a jaw positioning means located upstream of a pair of belly cutting blades for aligning the mouth of the fish with the belly cutting blades. The positioning means also positions the mouth at the correct cutting height so that as the fish head passes over the belly blades the tongue is cut from the jaw but not from the gills. The positioning means is preferably in the form of an adjustable ramp located along the conveying path of the fish.

The apparatus further includes a belly guide means located downstream of the belly cutting blades for centrally locating the belly and mouth of the fish along the conveying path. The belly guide means guides the fish with its tongue riding lower than its head and ribs. A gill removal wheel utilizes the tongue to pull the gills from their gill cavities and thus the gills and viscera are easily removed without damaging the head of the fish. The belly guide means is preferably in the form of a narrow guide horse having a groove formed along its length for receiving the tongue and anal fin of the fish. The upstream end of the guide horse forms an inclined plane with respect to the conveying path so that the fish backbone is positioned at the proper height irrespective of fish size.

The apparatus also includes a kidney removal means located downstream of the gill removing means. The kidney removal means comprises a cleaning wheel having a profiled design which matches the interior of the belly cavity for removing the blood line kidney beneath the backbone without damaging or breaking the backbone or ribs.

In another aspect, the invention also includes a method of removing the gills, viscera and blood line kidney from head on fish. The method includes the steps of aligning the mouth and belly of the fish with a pair of belly cutting blades, passing the fish over the belly cutting blades at a cutting height whereby the tongue is cut from the jaw but not from the gills, and then transporting the fish over gill, viscera and kidney removal means.

Other objects and advantages will appear during the course of the following description.

BRIEF DESCRIPTION OF THE DRAWINGS

The drawings illustrate the best mode presently contemplated of carrying out the invention.

In the drawings:

FIG. 3 is a plan view of the components of the machine shown in FIG. 2;

FIG. 5 is a fragmentary side view in elevation of the belly guide scabs, belly guide horse, and gill removal wheel for use in the machine of FIG. 1;

FIG. 6 is a plan view of the machine components shown in FIG. 5;

DESCRIPTION OF THE PREFERRED EMBODIMENT

Figure 1:
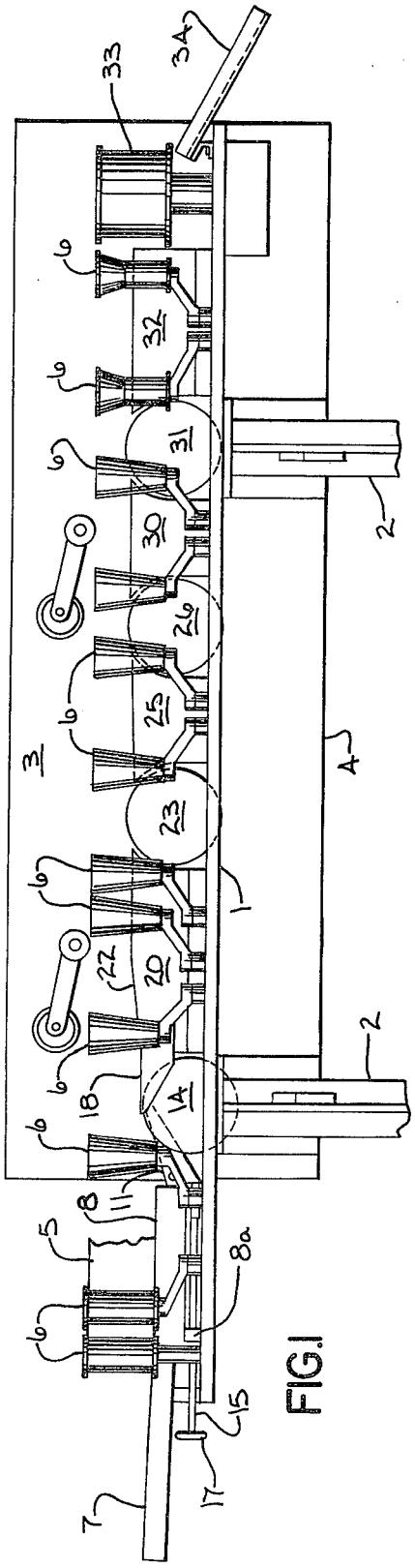
FIG. 1 is a side view in elevation of a machine for removing the gills, viscera and kidney from a head on fish illustrating a preferred embodiment of the present invention.

Referring now to the drawings, FIG. 1 shows a machine for removing the gills, viscera and blood line kidney from head on fish constituting a preferred embodiment of the present invention. The machine includes a frame 1 supported by a pair of legs 2 for mounting the work performing elements of the machine. The work performing elements are housed within an enclosure generally defined by a rear wall 3, the frame 1 and a cover (not shown) hingedly mounted to the top of wall 3. The machine also includes a trough 4 located beneath frame 1 and between legs 2 for collecting waste material from the fish. The machine includes a pair of feed conveyor belts 5 for transporting the fish along a conveying path. Belts 5 are driven in the conventional manner and are positioned and controlled by a plurality of rollers 6. The rollers 6 are spring loaded and control the position of belts 5 and thus control the driving force on the fish in the conventional manner as they are conveyed through the machine.

The machine includes a feed tray 7 which guides the fish between the conveyor belts 5. Feed tray 7 may be of any conventional design including the type having a V-cut along its center line. It should be noted that the present machine is preferably utilized with head on fish and thus an operative merely feeds the fish head end first along the tray 7 into belts 5 at the inlet side or left side of the machine, as shown in FIG. 1.

Figure 2:
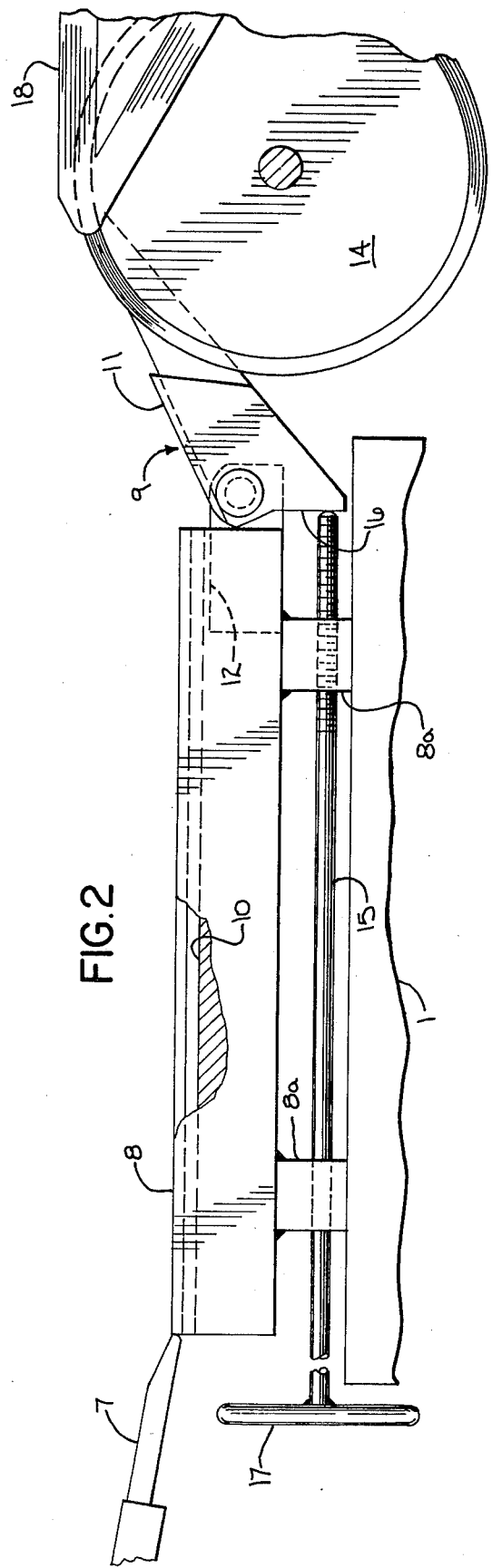
FIG. 2 is a fragmentary side view in elevation of the infeed horse, adjustable positioning ramp and belly cutting blades for use in the machine of FIG. 1.

After being picked up by belts 5, the fish is conveyed onto an infeed horse 8 and is carried along the horse 8 until it hits an adjustable positioning means 9, as shown in FIGS. 2 and 3. Infeed horse 8 includes legs 8a for mounting on frame 1, and the top of infeed horse 8 includes a trough-shaped opening 10 which receives the belly of the fish. This trough-shaped opening 10 correctly positions the fish with its head leading along the conveying path in substantially a straight line.

The adjustable positioning means 9 includes a narrow ramp member 11 pivotally mounted at its upstream end in a housing 12 which in turn is bolted to forward end of infeed horse 8. The pivotal connection of the ramp member 11 is provided by a pin extending transversely through the upstream end of member 11 into housing 12 to enable member 11 to pivot in a vertical plane. The member 11 includes an upstream portion having a trough-shaped groove 13 formed in its upper end for receiving the fish and maintaining proper alignment of the mouth of the fish with respect to a pair of belly cutting blades 14. The downstream portion of ramp member 11 is in the form of a narrow tongue that projects between the twin belly blades 14, as shown in FIG. 3. As the fish hits ramp 11 its mouth is closed and the fish is guided at the correct height over the twin blades 14. Ramp 11 forms an inclined plane with respect to the conveying path, and as seen in FIG. 2, the machine includes a means for adjusting the angle of ramp 11 to adjust the cutting depth of blades 14. This adjusting means includes a rod 15 mounted for sliding movement in legs 8a of infeed horse 8 for engagement with a projecting portion 16 extending downwardly from the upstream portion of ramp 11. Rod 15 includes a handle 17 for easy manipulation. Thus, if it is desired to increase the angle of ramp 11 and thus decrease the cut made by the twin blades 14, rod 15 is pushed to the right as shown in FIG. 2 against projecting portion 16 thus pivoting the forward end of ramp 9 counterclockwise. If it is desired to decrease the angle of ramp 11 rod 15 is slid to the left as shown in FIG. 2 allowing ramp 11 to rotate clockwise.

Figure 4:
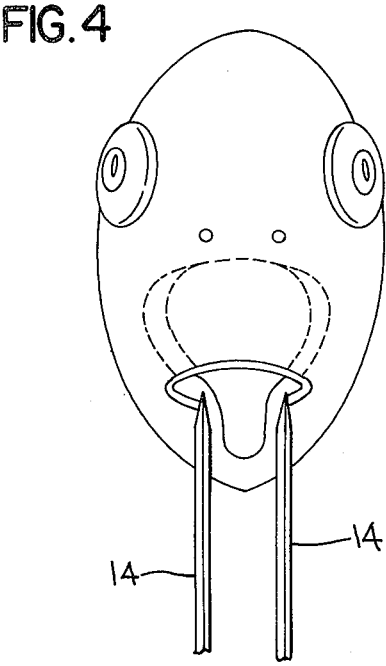
FIG. 4 is an end view showing the twin cut of the belly cutting blades for cutting the tongue away from the jaw of a fish.

As shown in FIG. 4, the adjustment of the angle of the positioning ramp 11 to change the cutting depth of blades 14 combined with the spacing between the belly cutting blades 14 is such that the tongue of the fish can be cut away from the jaw but left attached to the gills. Such a cut is desirable because with fish that must be cleaned with their head on the tongue may be used to pull the gills out of their gill cavities so that the gills may be exposed. Once the gills are exposed, they may be removed away by a cleaning wheel which will hereinafter be described. Thus, it is important to control the depth of the cut into the jaw of the fish so that the tongue is not cut away from the gills. The positioning ramp 11 thus provides a convenient mechanism for controlling the depth of the cut by the blades 14.

After cutting the tongue from the jaw, the belly of the fish passes over the belly cutting blades 14 to cut open its belly. The fish is then conveyed onto a pair of guide scabs 18. The leading edge 19 of guide scabs 18 is tapered and angled away as shown in FIG. 3 to insure that the loose jaw of the fish does not impale on the leading edge 19 and stall the fish on guide scabs 18. As the fish is transported onto guide scabs 18, its abdominal cavity is spread out with its belly flaps straddling the top edges of the guide scabs 18. As the tail end of the fish approaches the twin blades 14, the guide scabs lift the tail over the blades ensuring that the cut finishes at the anus.

Figure 7:
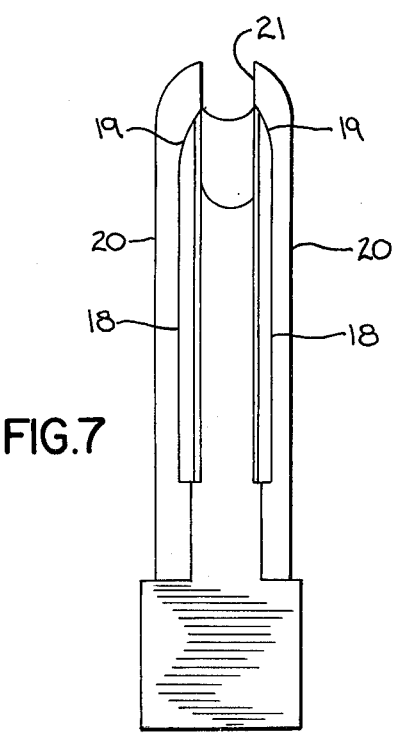
FIG. 7 is an end view of the components of FIG. 5.

The fish is then carried along the guide scabs 18 by feed belts 5 until it reaches guide horse 20. Guide horse 20 comprises a belly guide means and as shown in FIGS. 5–7 includes a narrow upstanding support member having a groove 21 formed in its top, as seen best in FIG. 7. As shown in FIG. 5, groove 21 of guide horse 20 receives the tongue of the fish in such a manner that the tongue is lower than the head and ribs of the fish. The importance of the tongue riding lower than the head and ribs will hereinafter be described. Groove 21 also receives the anal fin of the fish for centrally locating or tracking of the fish with respect to the other components of the machine. The backbone and ribs of the fish ride along the top edge of horse 20 which provides the proper cleaning height for the fish as it approaches the cleaning wheels. The top of guide horse 20 also forms an inclined plane 22 at its upstream end as seen in FIG. 5. The purpose of inclined plane 22 is to locate the fish backbone of each fish irrespective of the fish size at the same cleaning height. Thus, irregardless of fish size (within the limitations of the machine) each fish will end up or finish at the same cleaning height at downstream end of horse 20. Thus, inclined plane 22 provides a means for properly positioning the belly of a fish at the correct height for cleaning irrespective of fish size.

After being properly positioned by guide horse 20, the fish is transported by feed belts 5 to a gill cleaning wheel 23. Cleaning wheel 23 is mounted for counter-clockwise rotation, as seen in FIG. 1, and is used to remove the tongue, gills, and viscera from the fish. As shown in FIG. 6, the radially outer edges of wheel 23 are rounded off and a plurality of radially extending bores 24 are formed in its circumference. Wheel 23 is preferably formed of stainless steel with a diameter of about 6 inches and has a thickness of about ¾ inch to about ⅞ inch with the diameter of the bores 24 being substantially the same and preferably ⅝ inch and 11/16 inch respectively. Thus, the edges of the bores 24 form cutting surfaces and as the fish approaches the surfaces, the tongue of the fish is pulled downwardly which in turn pulls the gills out of their gill cavities and exposes them to the cutting surfaces. The fish then continues over wheel 23 to clean out its belly cavity. Thus, the tongue, gills, and viscera is removed from the fish by cleaning wheel 23.

After passing over gill cleaning wheel 23, the fish is transported by belts 5 to a backbone guide means. Backbone guide means includes a guide horse 25 comprising an upstanding narrow rail member extending longitudinally along the conveying path. Guide horse 25 is similar to guide horse 20 and includes a groove (not shown) formed along its top for receiving the anal fin. A pair of guide surfaces are formed on either side of the groove which engage and support the ribs of the fish. Thus, the top of guide horse 25 extends upwardly into the belly cavity and locates onto the backbone. Horse 25 positions the backbone of the fish at the correct height for passage over a kidney removal wheel 26.

Figure 8:
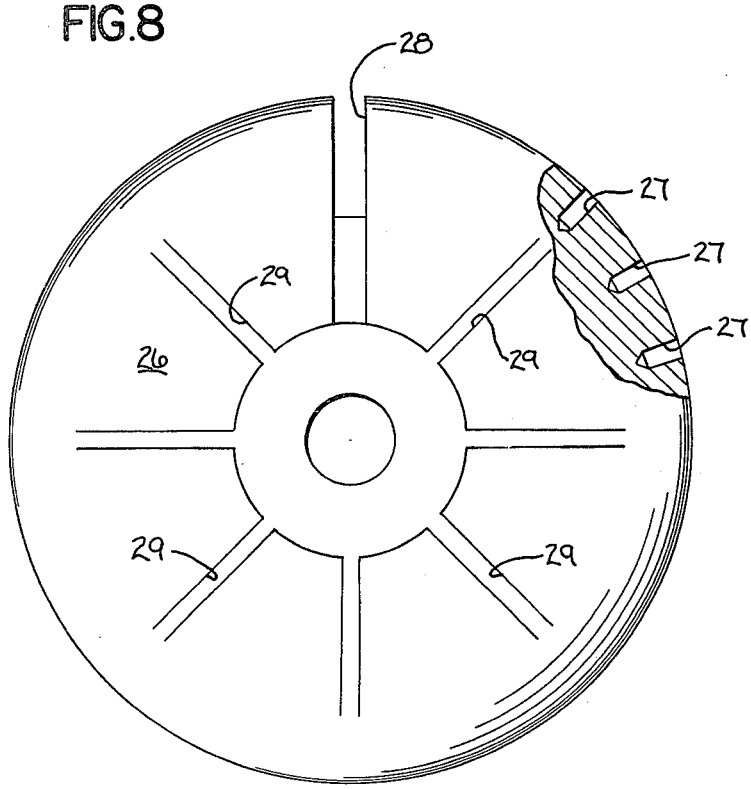
FIG. 8 is a side view in elevation with parts broken away of a cleaning wheel for use in the machine of FIG. 1.
Figure 9:
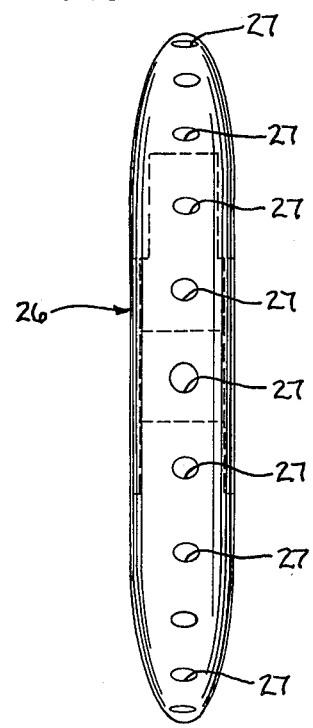
FIG. 9 is an end view of the cleaning wheel of FIG. 8.

Kidney removal wheel 26 is shown in FIGS. 8 and 9. As seen, wheel 26 is disc-shaped with its radially outer edges rounded. The rounded edges are profiled so that wheel 26 substantially conforms to the shape of the belly cavity of the fish being processed. Wheel 26 also includes a plurality of radially extending bores 27 formed in its circumference. The edges of bores 27 act as cutting surfaces in substantially the same manner as that described for wheel 23. As the fish passes over wheel 26, the cutting surfaces of bores 27 breaks the membrane covering the blood line kidney and removes it from the belly cavity. It is readily obvious to those skilled in the art that the number and size of bores 27 depends upon the fish being processed. Wheel 26 also includes an axial slot 28 formed through its radially outer edge margin, and a plurality of radially extending grooves 29 formed in its sides. Slot 26 is used to catch or impail any hanging matter such as gill tissue and remove it from the fish. Grooves 29 are used to rake off or clean the sides of the belly and mouth cavities.

The fish then passes over a third guide horse which correctly positions the fish for presentation to a final cleaning wheel 31. Horse 30 is substantially identical to horse 25, and cleaning wheel 31 is substantially the same as wheel 26. Wheel 31 removes any of the remaining loose blood or viscera.

The fish is then transported by belts 5 over a washing station 32 of any conventional design which sprays water inside the belly cavity. The fish is then ejected from the machine via ejection rollers 33 into chute 34 for further processing.

A preferred embodiment of a fish processing machine has been shown and described. However, it will be readily apparent to those skilled in the art that various modifications and substitutions may be made to the components described.

Various modes of carrying out the invention are contemplated as being within the scope of the following claims particularly pointing out and distinctly claiming the subject matter which is regarded as the invention.

I claim:

1. A fish processing machine for removing the gills, viscera and kidney from head on fish wherein said fish are transported belly-side-down and head end leading along a conveying path, said machine comprising:

a pair of spaced apart belly cutting blades for making a pair of cuts along the belly of the fish extending longitudinally of the fish body on opposite sides of the anal fin;

positioning means located upstream of the belly cutting blades, said positioning means including an infeed horse having a trough-shaped opening formed therein disposed longitudinally along said conveying path for aligning the mouth of the fish with the belly cutting blades and an inclined ramp positioned between said infeed horse and said belly cutting blades pivotally mounted to said infeed horse for movement in a vertical plane for positioning the mouth at a cutting height whereby as the fish head passes over the belly blades the tongue is cut from the jaw but not from the gills;

belly guide means located downstream of the belly cutting blades for centrally locating the belly and mouth of the fish along the conveying path;

a gill removal wheel located downstream of said belly guide means and positioned to extend upwardly into the mouth and belly for removing the gills and viscera from the fish;

backbone guide means located downstream of the cleaning wheel for centrally locating the backbone of the fish along the conveying path; and a kidney removal wheel located downstream of said backbone guide means and positioned to extend upwardly into the belly cavity of the fish for removing the blood line kidney of the fish.

2. The machine of claim 1, wherein the belly guide means includes a groove formed along its length that receives the anal fin and tongue of the fish.

3. The machine of claim 1, wherein the upstream end of the belly guide means forms an inclined plane extending upwardly with respect to said conveying path.

4. The machine of claim 1, wherein said ramp is inclined upwardly with respect to said conveying path.

5. The machine of claim 1, wherein the upstream end of said ramp is trough-shaped and the downstream end includes a tongue portion projecting between the belly cutting blades.

6. The machine of claim 1, wherein said positioning means further includes adjusting means for adjusting the amount of inclination of said ramp.

7. The machine of claim 1, wherein said gill removal wheel includes a plurality of radially extending bores in its circumference each having a diameter substantially equal to the width of said gill removal wheel.

8. The machine of claim 1, wherein the radially outer end of the kidney removal wheel has a cross sectional profile substantially identical to the interior of the belly cavity of the fish being processed.

9. The machine of claim 1, further including a pair of belly guide scabs located immediately downstream of the belly cutting blades and positioned to extend into the belly of the fish and lift the tail end of the fish over the belly cutting blades to end the belly cuts at the anus, said guide scabs having leading edges that are angled back to prevent stalling of the loose jaw of the fish.

10. The machine of claim 1, wherein said backbone guide means includes a groove formed along its length that receives the anal fin of the fish and a pair of guide surfaces on either side of said groove for supporting the ribs of the fish.

11. In a fish processing machine for removing the gills, viscera and kidney from head on fish wherein said fish are transported belly-side-down and head end leading along a conveying path, said machine including a pair of spaced apart belly cutting blades for making a pair of cuts along the belly of the fish extending longitudinally of the fish body, the improvement comprising positioning means located upstream from said belly cutting blades, said positioning means including an infeed horse having a trough-shaped opening formed therein disposed longitudinally along said conveying path for aligning the mouth of the fish with the belly cutting blades, an inclined ramp disposed longitudinally along said conveying path and positioned between said infeed horse and said belly cutting blades, said ramp pivotally mounted to said infeed horse for movement in a vertical plane for positioning the mouth at a cutting height such that as the fish head passes over the belly blades the tongue is cut from the jaw but not from the gills, adjusting means for adjusting the height of the ramp with respect to the belly cutting blades.

12. The machine of claim 11, wherein said ramp member forms an inclined plane extending upwardly with respect to said conveying path.

13. The machine of claim 11, wherein said ramp is pivotally mounted at its upstream end.

14. The machine of claim 12, wherein said ramp member has a tongue portion extending between the belly cutting blades.

15. A method of removing the gills, viscera and bloodline kidney from head on fish comprising the steps of aligning the mouth and belly of the fish with a pair of belly cutting blades, passing the fish over the belly cutting blades to make a pair of spaced longitudinal incisions in the fish at a cutting height whereby the tongue is cut from the jaw but not from the gills, removing the tongue and gills of the fish by passing the fish over a gill removal wheel having a plurality of radially extending bores in its circumference that pulls on the tongue to extract the gills from their gill cavities leaving the head intact, and transporting the fish respectively over viscera and kidney removal means.

16. The method of claim 15, further including the step of guiding the fish from the belly cutting blades downstream to the gill removal means by means of the anal fin and tongue of the fish.

17. The method of claim 16, wherein the fish is guided to the gill removal means with its tongue riding lower than its head and ribs.

18. A fish processing machine for removing the gills, viscera and kidney from head on fish wherein said fish are transported belly-side-down and head end leading along a conveying path, said machine comprising:
  belly cutting means for making a cut along the belly of the fish extending longitudinally of the fish body;
  positioning means located upstream of the belly cutting means, said positioning means including an infeed horse having a trough-shaped opening formed therein disposed longitudinally along said conveying path for aligning the mouth of the fish with the belly cutting means and an inclined ramp positioned between said infeed horse and said belly cutting blades pivotally mounted to said infeed horse for movement in a vertical plane for positioning the mouth at a cutting height whereby as the fish head passes over the belly cutting means the tongue is cut from the jaw but not from the gills;
  gill removal means located downstream of said belly cutting means and positioned to extend upwardly into the mouth and belly for removing the gills and viscera from the fish; and
  kidney removal means located downstream of said gill removal means and positioned to extend upwardly into the belly cavity of the fish for removing the blood line kidney of the fish.

* * * * *